(12) United States Patent    (10) Patent No.:   US 12,563,472 B2
Schlegel et al.        (45) Date of Patent:   *Feb. 24, 2026

(54) MULTIPOINT RELAY (MPR) NETWORK AND RELATED METHODS

(71) Applicant: L3HARRIS TECHNOLOGIES, INC., Melbourne, FL (US)

(72) Inventors: Christian Schlegel, Park City, UT (US); David G. Landon, Bountiful, UT (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 122 days.

This patent is subject to a terminal disclaimer.

(21) Appl. No.: 18/623,702

(22) Filed: Apr. 1, 2024

(65) Prior Publication Data

US 2025/0254597 A1    Aug. 7, 2025

Related U.S. Application Data

(63) Continuation of application No. 17/453,229, filed on Nov. 2, 2021, now Pat. No. 11,979,811.

(51) Int. Cl.
| | |
|---|---|
| *H04W 40/12* | (2009.01) |
| *H04W 24/08* | (2009.01) |
| *H04W 84/18* | (2009.01) |

(52) U.S. Cl.
CPC ........... *H04W 40/12* (2013.01); *H04W 24/08* (2013.01); *H04W 84/18* (2013.01)

(58) Field of Classification Search
None
See application file for complete search history.

(56) References Cited

U.S. PATENT DOCUMENTS

| | | |
|---|---|---|
| 8,448,589 B2 | 5/2013 | Maltha et al. |
| 2010/0142448 A1 | 6/2010 | Schlicht et al. |
| 2010/0246480 A1 | 9/2010 | Aggarwal et al. |
| (Continued) | | |

OTHER PUBLICATIONS

Qayyum et al. "Multipoint relaying for flooding broadcast messages in mobile wireless networks," Proc. 35th Hawaii Int. Conf. Systems Sciences (HICSS™ 02), Big Island, Jan. 2002; pp. 11. See Priority U.S. Appl. No. 17/453,229, filed Nov. 2, 2021.

(Continued)

*Primary Examiner* — Srinivasa R Reddivalam
(74) *Attorney, Agent, or Firm* — ALLEN, DYER, DOPPELT, GILCHRIST, P.A.

(57) ABSTRACT

A multipoint relay (MPR) wireless network may include spaced apart nodes, with each node including wireless transceiver circuitry, beacon circuitry, and a controller coupled to the wireless transceiver circuitry and beacon circuitry. The controllers may be configured to operate the beacon circuitry to determine a respective link strength metric for each potential link between nodes, assign a set of nodes from among the plurality of nodes to function as gateway nodes and assign other individual nodes to communicate via respective gateway nodes based upon the respective link strength metrics to define the MPR network so that one-hop links have a strongest link strength metric, and operate the wireless transceiver circuitry for communications over the MPR network.

18 Claims, 8 Drawing Sheets

(56) References Cited

U.S. PATENT DOCUMENTS

| | | | | |
|---|---|---|---|---|
| 2012/0236724 A1* | 9/2012 | Rudnick | ................ | H04L 45/54 |
| | | | | 370/255 |
| 2014/0056210 A1* | 2/2014 | Jafarian | ................ | H04L 45/12 |
| | | | | 370/315 |
| 2018/0091416 A1* | 3/2018 | Ghosh | ................ | H04W 40/248 |
| 2018/0302807 A1* | 10/2018 | Chen | .................... | H04W 28/26 |
| 2019/0098625 A1* | 3/2019 | Johnson | .............. | H04B 7/0697 |
| 2025/0126542 A1* | 4/2025 | Ross | .................... | H04L 45/122 |

OTHER PUBLICATIONS

Prabu et al. "Power Aware Routing Protocol in Mobile Ad-hoc Networks" IJCSI international Journal of Computer Science Issues. vol. 12. Issue 1, No. 2, Jan. 2015; pp. 37-41. See Priority U.S. Appl. No. 17/453,229, filed Nov. 2, 2021.

Ahn et al. "CLSR: Cognitive Link State Routing for CR-based Tactical Ad Hoc Networks" KSII Transactions on Internet and Information Systems vol. 9, No. I, Jan. 2015; pp. 50-67. See Priority U.S. Appl. No. 17/453,229, filed Nov. 2, 2021.

* cited by examiner

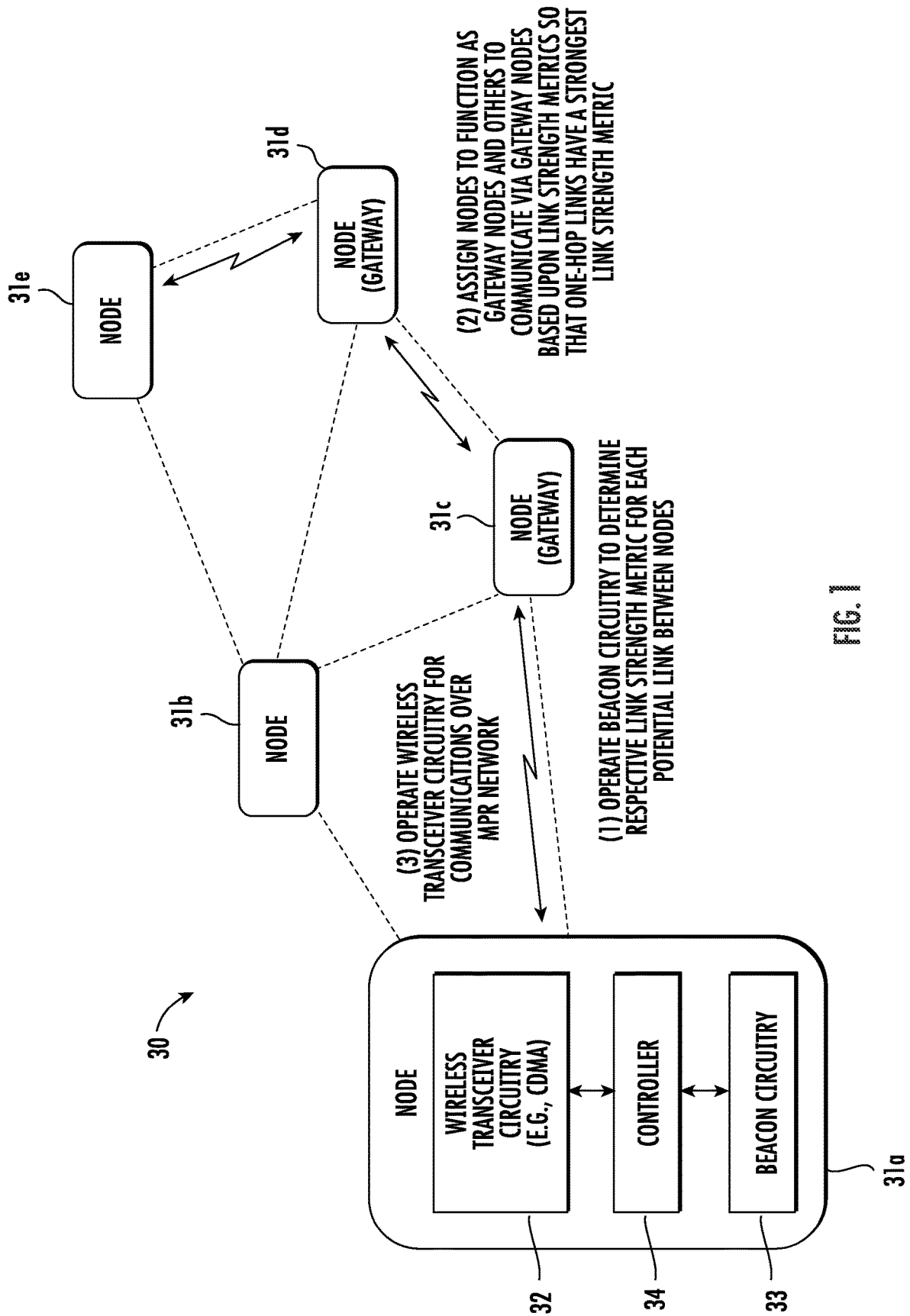

(2) ASSIGN NODES TO FUNCTION AS GATEWAY NODES AND OTHERS TO COMMUNICATE VIA GATEWAY NODES BASED UPON LINK STRENGTH METRICS SO THAT ONE-HOP LINKS HAVE A STRONGEST LINK STRENGTH METRIC (3) OPERATE WIRELESS TRANSCEIVER CIRCUITRY FOR COMMUNICATIONS OVER MPR NETWORK (1) OPERATE BEACON CIRCUITRY TO DETERMINE RESPECTIVE LINK STRENGTH METRIC FOR EACH POTENTIAL LINK BETWEEN NODES

NODE

WIRELESS TRANSCEIVER CIRCUITRY (E.G., CDMA)

CONTROLLER

BEACON CIRCUITRY

FIG. 1

MULTIPOINT RELAY (MPR) NETWORK AND RELATED METHODS

RELATED APPLICATIONS

This application is a continuation application of U.S. patent application Ser. No. 17/453,229 filed Nov. 2, 2021, which is hereby incorporated in its entirety by reference.

GOVERNMENT LICENSE RIGHTS

This invention was made with government support under contract number HR0011-18-C-0105 awarded by the Defense Advanced Research Projects Agency (DARPA). The government has certain rights in the invention.

TECHNICAL FIELD

The present application relates to communications networks and, more particularly, to multipoint relay (MPR) networks and related methods.

BACKGROUND

Mobile vehicles with radio frequency (RF) capabilities may be deployed in numerous environments for various purposes. For example, in many applications it is desirable to transmit information from a remote location to a base station in real time. However, limited communication ranges and the absence of a free line of sight may make direct transmissions from distant targets impossible, such as when operating over rough terrain and long distances. One approach to overcome these obstacles is by using relay chains including one or more intermediate relays defining a multipoint relay (MPR) network.

An MPR configuration may be used in wireless networks and may be characterized by source and destination nodes connected by intermediate nodes. In a widely distributed network, the source and destination nodes may not otherwise communicate directly because the link would be degraded due to, for example, distance-dependent path loss or signal interference. The intermediate nodes in a relay network allow for shorter signal propagation distances that attempt to mitigate the impact of path loss and RF interference.

One example MPR system is set forth in U.S. Pat. No. 8,488,589 to Rudnick. This communication system includes a plurality of mobile nodes forming a mesh network. A plurality of wireless communication links connect the mobile nodes together. Each mobile node is operative for transmitting data packets wirelessly to other mobile nodes via the wireless communications link from a source mobile node through intermediate neighboring mobile nodes to a destination mobile node using a link state routing protocol and multiple relay selection.

Despite the advantages of such systems, further advancements in multipoint relay communications may be desirable in certain applications.

SUMMARY

A multipoint relay (MPR) wireless network may include a plurality of spaced apart nodes, with each node including wireless transceiver circuitry, beacon circuitry, and a controller coupled to the wireless transceiver circuitry and beacon circuitry. The plurality of controllers may be configured to operate the beacon circuitry to determine a respective link strength metric for each potential link between nodes, assign a set of nodes from among the plurality of nodes to function as gateway nodes and assign other individual nodes to communicate via respective gateway nodes based upon the respective link strength metrics to define the MPR network so that one-hop links have a strongest link strength metric, and operate the wireless transceiver circuitry for communications over the MPR network.

In an example implementation, the wireless transceiver circuitry may be configured to transmit a plurality of orthogonal data streams. In some embodiments, the wireless transceiver circuitry may be configured to transmit a plurality of orthogonal data streams at different data rates. By way of example, the wireless transceiver circuitry may comprise Code Division Multiple Access (CDMA) circuitry. Also by way of example, the link strength metric may comprise at least one of link loss, link signal-to-noise ratio, and link peak data rate.

In an example embodiment, the plurality of controllers may be configured to reduce transmit power while meeting a desired data rate. Furthermore, at least some of the plurality of nodes may comprise ground-based, mobile nodes. In addition, the wireless transceiver circuitry may be configured to communicate one of voice and video data.

A related method of operating an MPR wireless network, such as the one described briefly above, is also provided. The method may include using the plurality of controllers to operate the beacon circuitry to determine a respective link strength metric for each potential link between nodes, assign a set of nodes from among the plurality of nodes to function as gateway nodes and assign other individual nodes to communicate via respective gateway nodes based upon the respective link strength metrics to define the MPR network so that one-hop links have a strongest link strength metric, and operate the wireless transceiver circuitry for communications over the MPR network.

BRIEF DESCRIPTION OF THE DRAWINGS

FIG. 1 is a schematic block diagram of multipoint relay (MPR) wireless network in accordance with an example embodiment.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

By way of background, typical multipoint relay (MPR) protocols attempt to minimize the number of transmission hops in a given network. The typical MPR protocol gives no consideration to the network traffic rates or transmit powers used. These, however, are important parameters in MPR networks, particularly in ground-to-ground networks.

Generally speaking, the present approach provides certain enhancements to the conventional IETF RFC3626-Optimized Link State Routing Protocol (OLSR). One of these enhancements affects the initial one-hop neighbor assignments. More particularly, one-hop neighbor assignments are adjusted to use a new definition of "nearest" node, which considers signal path loss during or after network discovery, to facilitate subsequent power-optimal routing choices.

Another enhancement over the conventional MPR protocol involves a modification of selection of the MPR routing nodes used to reach the set of two-hop neighbors. More particularly, the assignment of MPR nodes is adjusted to give preferential treatment to nodes which have low path loss and provide strong links. MPR node assignments first add those neighbor nodes which are the sole connection for some two-hop neighbors, as in the typical MPR algorithm. However, the following MPR assignments are made with a different priority from the conventional algorithm, and priority is given to adding the one-hop neighbor node that is "nearest" to the reference node, as will be discussed further below.

Figure 7:
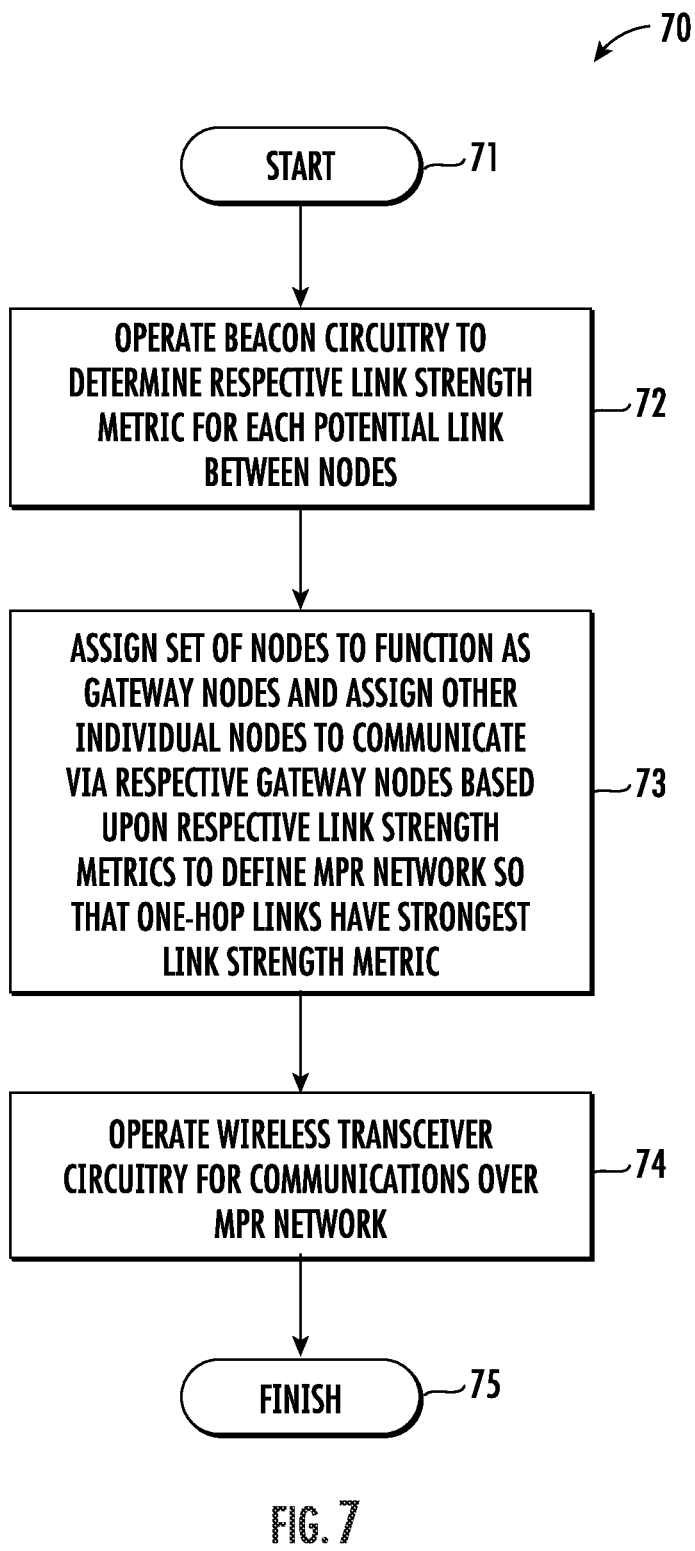
FIG. 7 is a flow diagram illustrating example method aspects associated with the MPR wireless network of FIG. 1.

Referring initially to FIG. 1 and the flow diagram 70 of FIG. 7, an MPR wireless network 30 and associated method aspects are first described. The network 30 illustratively includes a plurality of spaced apart nodes 31a-31e, with each node including wireless transceiver circuitry 32, beacon circuitry 33, and a controller 34 coupled to the wireless transceiver circuitry and beacon circuitry. By way of example, the wireless transceiver circuitry 32 may operate in the Ultra High Frequency (UHF) or Super High Frequency (SHF) radio frequency (RF) range and using Code Division Multiple Access (CDMA), although other frequencies and communications formats may be used in different embodiments. The beacon circuitry 33 may be configured to produce RF pulses that announce availability of the nodes 31a-31e for communication within the network 30, as well as other pertinent information such as location (e.g., as determined by a satellite positioning (GPS) receiver) and various operational parameters or metrics, as will be discussed further below. The controller 34 may be implemented using appropriate hardware (e.g., microprocessor) and associated non-transitory computer-readable medium having computer-executable instructions for performing the various operations described herein.

Beginning at Block 71, the controllers 34 of the nodes 31a-31e are configured to operate the beacon circuitry 33 to determine a respective link strength metric (e.g., link loss, link signal-to-noise ratio (SNR), link peak data rate, etc.) for each potential link between the nodes, at Block 72. The potential links are indicated with dashed lines in FIG. 1. The controllers 34 are also configured to assign a set of nodes as gateway nodes (here the nodes 31c and 31d), and assign other individual nodes to communicate via respective gateway nodes based upon the respective link strength metrics to define the MPR network 30 so that one-hop links have a strongest link strength metric, at Block 73. The controllers 34 are further configured to operate the wireless transceiver circuitry 74 for communications over the MPR network 30, at Block 74, which illustratively concludes the method of FIG. 7.

Figure 2:
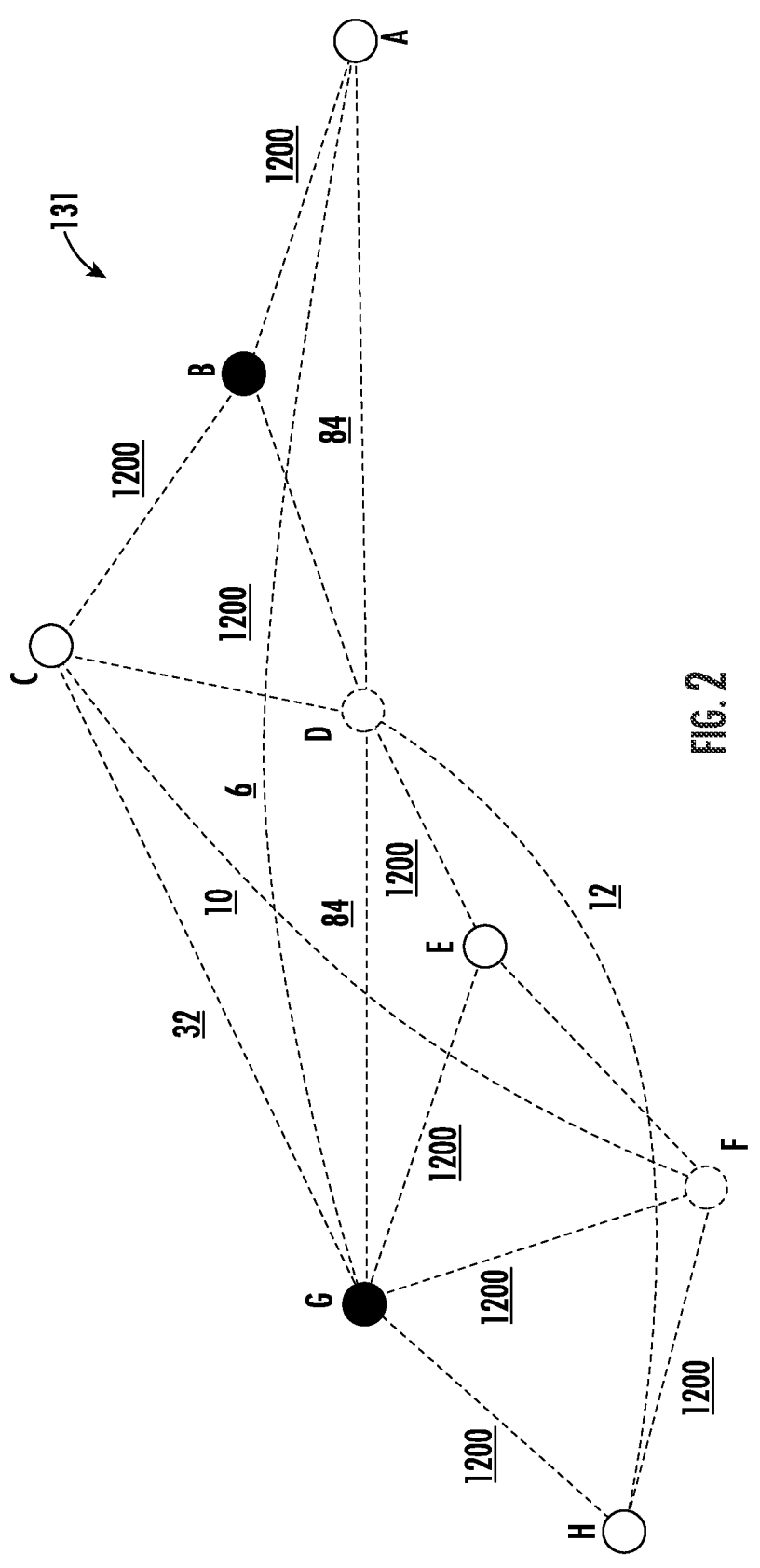
FIGS. 2-3 are schematic block diagrams illustrating an example MPR network configuration in which the MPR wireless network of FIG. 1 may be implemented.
Figure 3:
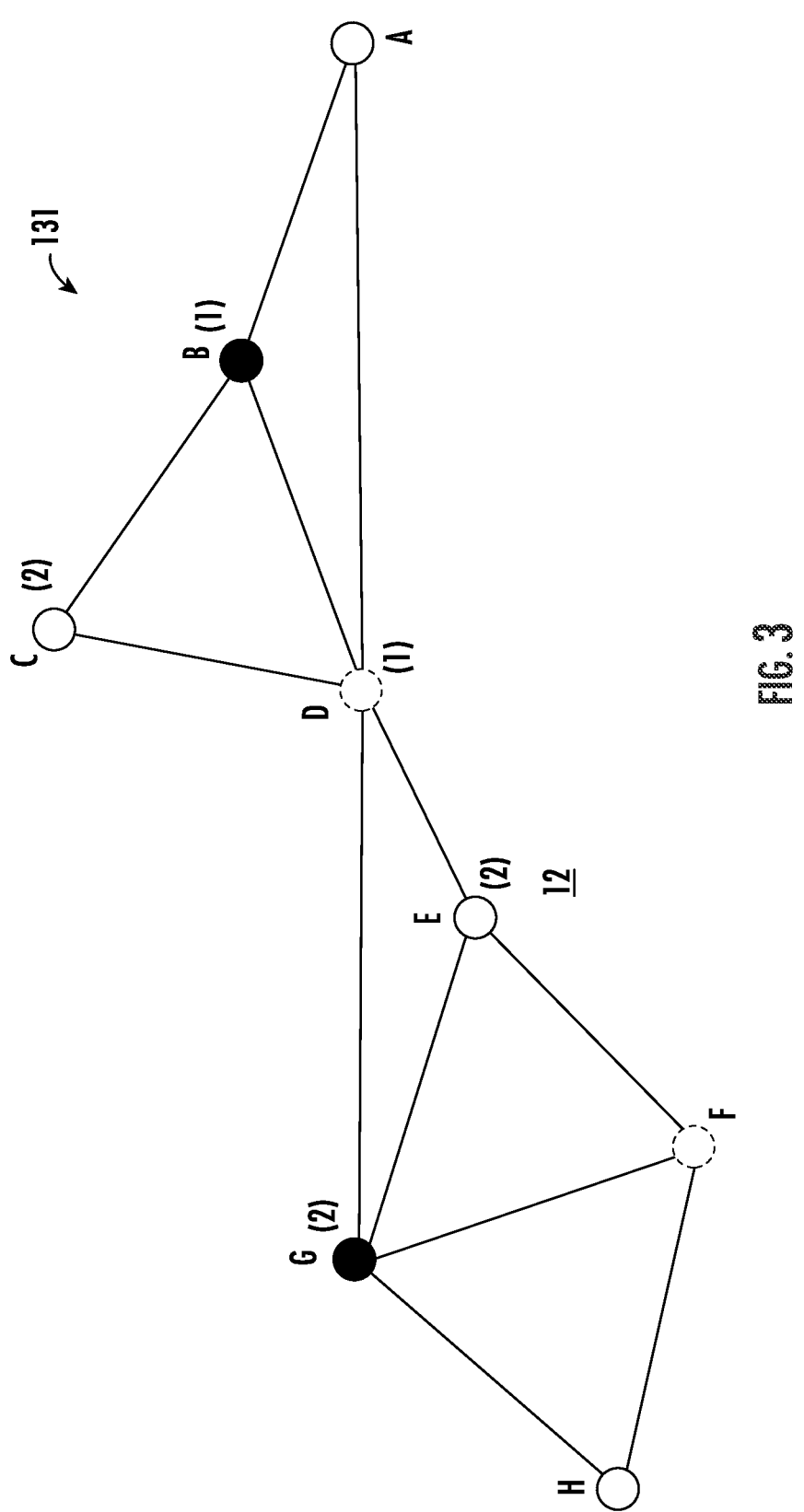

The foregoing will be further understood with reference to an example network 131 illustrated in FIGS. 2-3. In the illustrated network 131, there are eight nodes A-H, all of which are similar to the node 31a described above. In this example, CDMA network transmissions are used, in which nodes A-H transmit on a given frequency and receive on one or more different frequencies. However, the approach described herein for MPR network establishment may be used with other wireless communication formats, such as Orthogonal Frequency Division Multiplexing (OFDM), Time Division Duplex (TDD) and Time Division Multiple Access (TDMA), and Multiple Input Multiple Output (MIMO), for example.

The present approach for selecting routing nodes may have significant effects on transmit power, node detectability/geo-locatability, network self-interference, and aggregate throughput in the network. Moreover, this may be achieved using only local information, rather than a global view typically unavailable to mobile ad-hoc network (MANET) nodes. In the illustrated example, the nodes A-H are spread out by approximately 0.5 km, and have a 20 mW peak power. Node A is the lead or source node and transmits video (700 kbit/s)+voice (10 kbits/s). The terrain is suburban with Hata loss.

The numbers associated with each prospective link (indicated by dashed lines) in FIG. 2 represent the achievable maximal bit rates between nodes A-H in kbits/s using a Hata suburban propagation model between the nodes. Assuming that the receivers can maintain up to 5 connections each, discovery of the network 131 will allow for the links between nodes as shown. In FIG. 3, the numbers in parentheses are the neighbor ranks from reference node A, e.g., the minimum path length in link hops from node A to a given node for a given network or graph connectivity.

Figure 4:
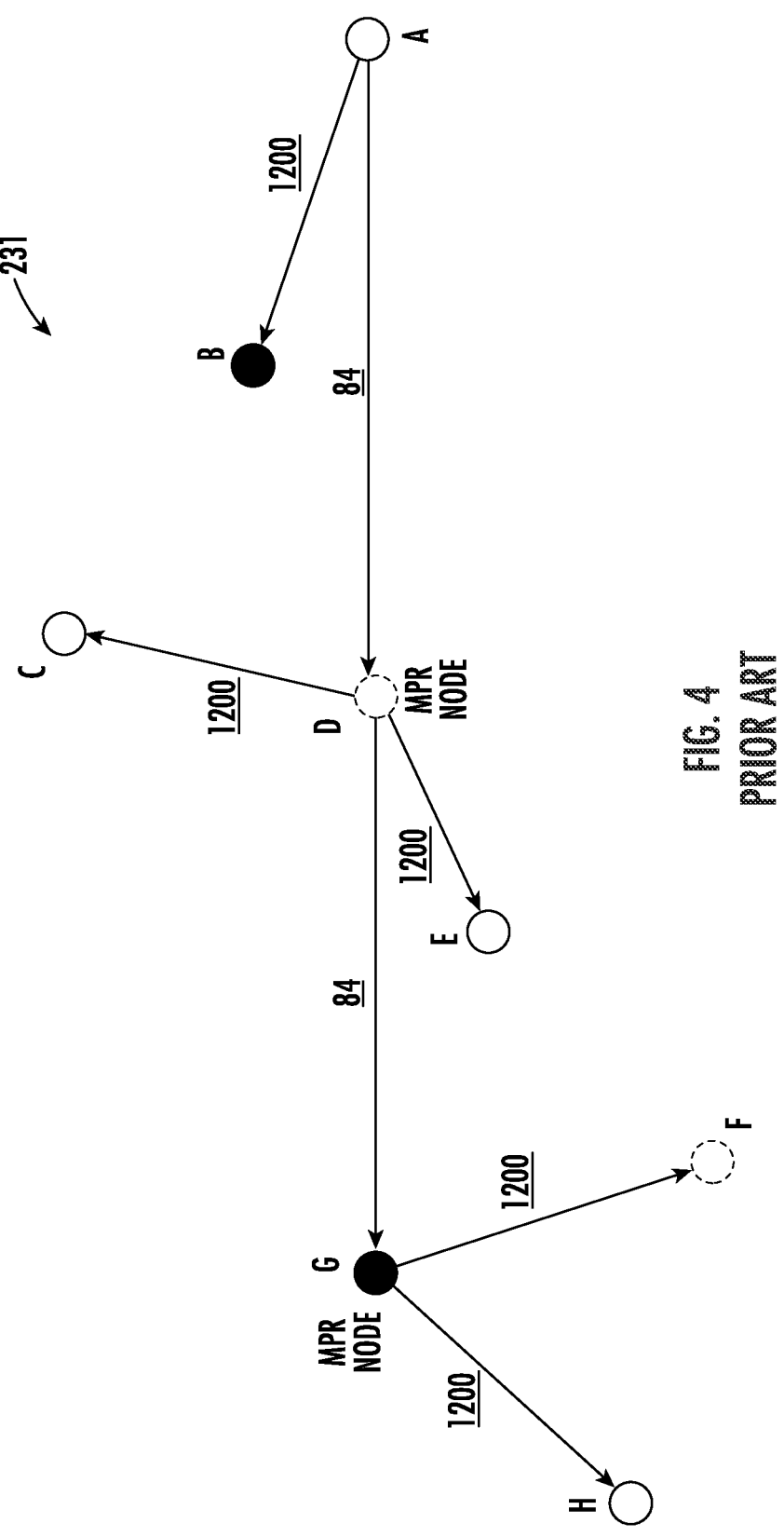
FIG. 4 is a schematic block diagram of a conventional MPR implementation of the network configuration of FIGS. 2 and 3.

As seen in FIG. 4, the conventional MPR approach would select Nodes D and G as MPR gateways for the network 131, which minimizes broadcast traffic in terms of link hops. The traffic from Node A to the rest of the nodes in the MPR network 231 in this example is routed according to the conventional MPR protocol. Here again, the numbers next to each link are data rates on the links (in kbits/s) without considering interference. The sharp drop-off in rates with distance is due to the strong distance loss in ground-to-ground connections, which significantly handicaps the links from A to D and D to G (nodes D and G being the gateway nodes), effectively starving traffic rates to Nodes C, D, E, G, H, and F, and only nearby Node B can benefit from the full data rate (1200 kbits/s) that Node A has to offer.

Figure 5:
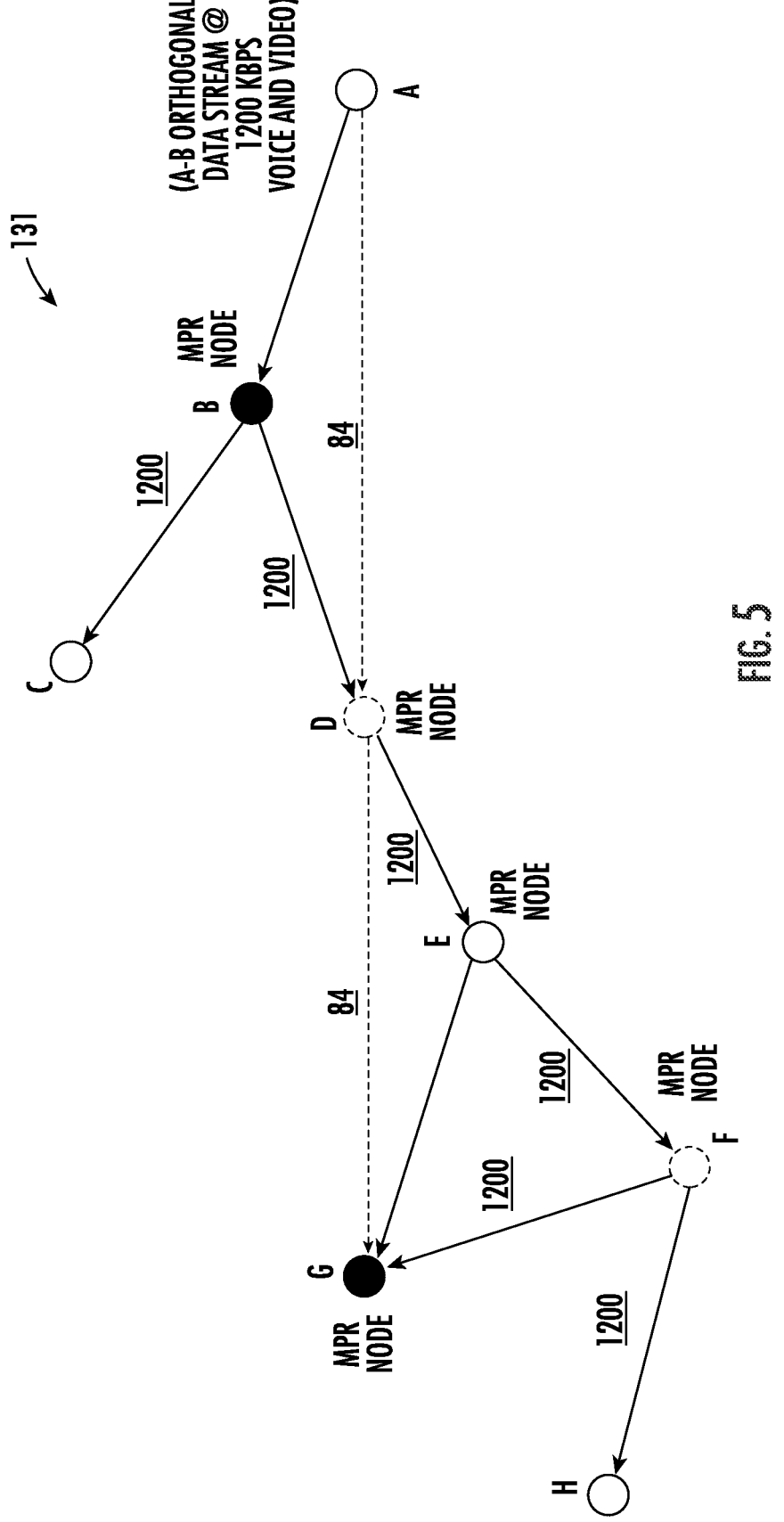
FIG. 5 is a schematic block diagram of a power aware implementation of the network configuration of FIGS. 2 and 3 in accordance with an example embodiment.

By way of contrast, in the example of FIG. 5 the network 131 uses a power aware (PA) enhancement to the conventional MPR protocol to construct a different MPR network configuration. More particularly, this approach involves choosing more power efficient links to establish the set of MPR gateway nodes. More particularly, nodes B, D, E and F are selected as the gateway nodes (labeled "MPR nodes" in FIG. 5) using the present approach. While the overall network delay in terms of number of hops is increased, the achievable data rates and power assignments are significantly better than those in the previous conventional MPR node configuration shown in FIG. 4. Furthermore, even direct traffic to the neighboring nodes A-D and D-G will be routed via the MPR nodes if the power constraints during traffic assignments are enforced.

Since ground path loss climbs rapidly with range (~14 dB for doubling the distance), the above-described power aware network establishment approach may provide significant improvements in MPR networks, particularly ground-to-ground networks. From the above-described example, it will be appreciated that while traditional MPR establishment of a network may achieve reduced latency and traffic duplication at the network level, in many cases it may experience poor data rates (84 kbit/s aggregate traffic in the above example) and require substantial power resources. Yet, the power aware MPR approach helps to circumvent drawbacks associated with the conventional MPR approach to establish an efficient network by giving priority to low-loss links among the network nodes. In the above example, an aggregate rate of 1.2 Mbits/s is maintained with a power savings of 13 dB. Moreover, the power aware MPR approach advantageously retains the resilience of MPR in the face of link blockage or loss, as may be seen from the multiple routes available between nodes in FIG. 5, even if a rate loss may be incurred. In this regard, the controllers 34 advantageously reduce transmit power while meeting a desired data rate.

Using information local to a given node (as opposed to global information), high network throughputs and stealth may still be achieved using the power aware MPR approach. In contrast to a topology formation based on global information, in the present approach nodes need only consider received power from a known beacon transmitter to identify "nearness." Given this nearness information, relatively inexpensive changes to the conventional routing protocol may be used to provide power aware routing. By way of example, the power aware approach may achieve a 20-30 dB difference in required transmit power in an example implementation. This translates to 20-30 dB better stealth (LPD) since lower power transmissions are less detectable, or 20-30 dB more data rate due to 20-30 dB less network self-interference. Furthermore, this comes with little or no additional processing cost during MPR assignments, and requires little or no added network messaging burden.

The conventional MPR approach does not reconfigure one-hop neighbor assignments, and may therefore suffer from poor connections often generated during ad-hoc network entry and neighbor discovery. Furthermore, the conventional MPR approach favors minimal hop counts to minimize latency, which favors sending traffic over more distant hops. Yet, this may be a potentially problematic strategy in CDMA ground scenarios, for example, where the path loss exponent is high, and where near-far problems exacerbate CDMA interference challenges. However, the advantages discussed above may also advantageously be experienced in airborne or other non-ground node networks, though the dB-improvement levels may be somewhat lower, due to a more benign path loss environment.

It has also been found that, with respect to the power aware approach shown in FIG. 5, hop count/latency penalties are generally modest. This is because routing through a "nearest" power optimal node rather than a worse node in some cases does not change the total hop count. Yet, it does change the required transmit power and helps prevent runaway "yelling matches" between interfering nodes, as will be appreciated by those skilled in the art.

Indeed, the present approach often leads to lower routing latencies, despite an increased hop count. Consider passing a 1500-byte Ethernet packet from node A to node D using the prior art MPR method of FIG. 4 vs. the present method of FIG. 5. In the prior art, the packet is transmitted once across a single hop directly to D, whereas the present method transmits twice: first to B and from there to D. This doubles the transmit/receive processing. Yet, processing time is often quite small compared to the buffering time required to collect packet bits, and apply packet level processing and validation. Buffering time strongly favors the present approach. The 1500 byte Ethernet packet requires 1500 bytes*8 bits/byte/84 kbits/s=0.14 seconds to buffer before processing can complete in the prior approach. The same packet requires 1500 bytes*8 bits/byte/1200 kbits/s=0.01 seconds to buffer in the present approach. Despite requiring two hops to reach D, the total buffering time is still seven times lower than for the prior art.

Referring again to the example of FIG. 5, it will be appreciated that broadcasts by node A at the 1.2 Mbps rate supported by node B would "starve" node D in that node D cannot recover transmissions at that rate. This is because the link between nodes A and B is limited to 84 kbits/s. Using the traditional MPR approach, node A would otherwise have to throttle data to the lowest supported data rate (i.e., 84 kbits/s) in order to broadcast to both nodes B and D.

However, another advantageous aspect of the present approach is that it may utilize orthogonal codes (e.g., through a PHY layer implementation) which allows node A to transmit at different rates to nodes B and D. That is, the wireless transceiver circuitry 32 may be configured to transmit a plurality of orthogonal data streams, and at different data rates. In the present example, node A would initially choose node B as the first gateway node, but not node D (node D is later chosen by node B, not node A). Node A then delivers data to node B and nothing to node D, node E passes data to node E and nothing to node G, etc. This initially allows 1.2 Mbps to be achieved across the network 131 from node A all the way through to node H. In this example, this would allow for the transmission of voice, PLI, and video data (711 kbps) to 7 nodes, or 4.98 Mbps delivered.

Figure 6:
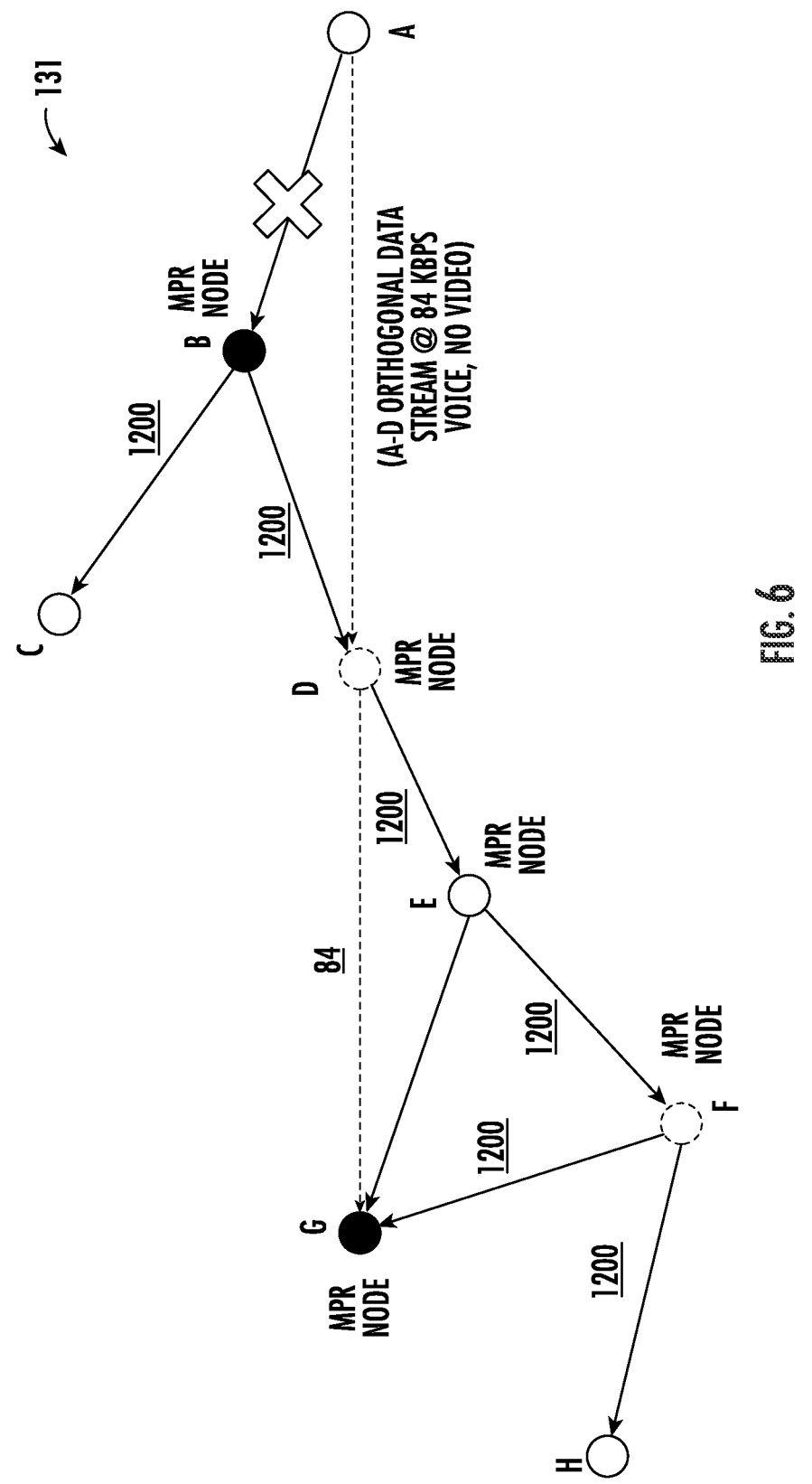
FIG. 6 is a schematic block diagram of the network configuration of FIG. 5 in which different orthogonal data streams at different data rates may be used to provide enhanced resiliency in an example embodiment.

Yet, the use of orthogonal codes still allows for network resiliency to be retained. Suppose the path between nodes and A and B gets blocked (e.g., node B goes behind a building), as represented in FIG. 6. The link between nodes A and D still exists, and traffic may be relatively easily rerouted to node D until the link between nodes A and B can be restored. In this case, a quality of service (QOS) determination may cause the controller 34 of node A to drop the video transmission during the time the link between nodes A and B is down, for example. However, by way of contrast, the traditional MPR approach would cause video to be dropped completely, not just during intermittent blockage of node B. This offers a more resilient approach against blockage than pruning under the conventional MPR scheme, for example.

If LPD impact is a significant concern, then the network 131 may trade data rate for power. For example, using the power aware MPR would carry broadcast voice data at 13 dB less power than the same traffic carried by a traditional MPR approach in the present example.

While the power aware MPR approach was discussed above with respect to broadcast transmissions, it will be appreciated that similar benefits will also be provided for power aware unicast and multicast applications as well. As discussed above, the power aware routing approach provides a technical advantage over simple pruning in the conventional MPR approach. Instead, power aware routing provides for both resilience and rate/power benefits, as discussed further above. Furthermore, orthogonal codes may advantageously be used to enable route choices of different rates, and to enable vital connections to far nodes without dropping higher local traffic.

Figure 8:
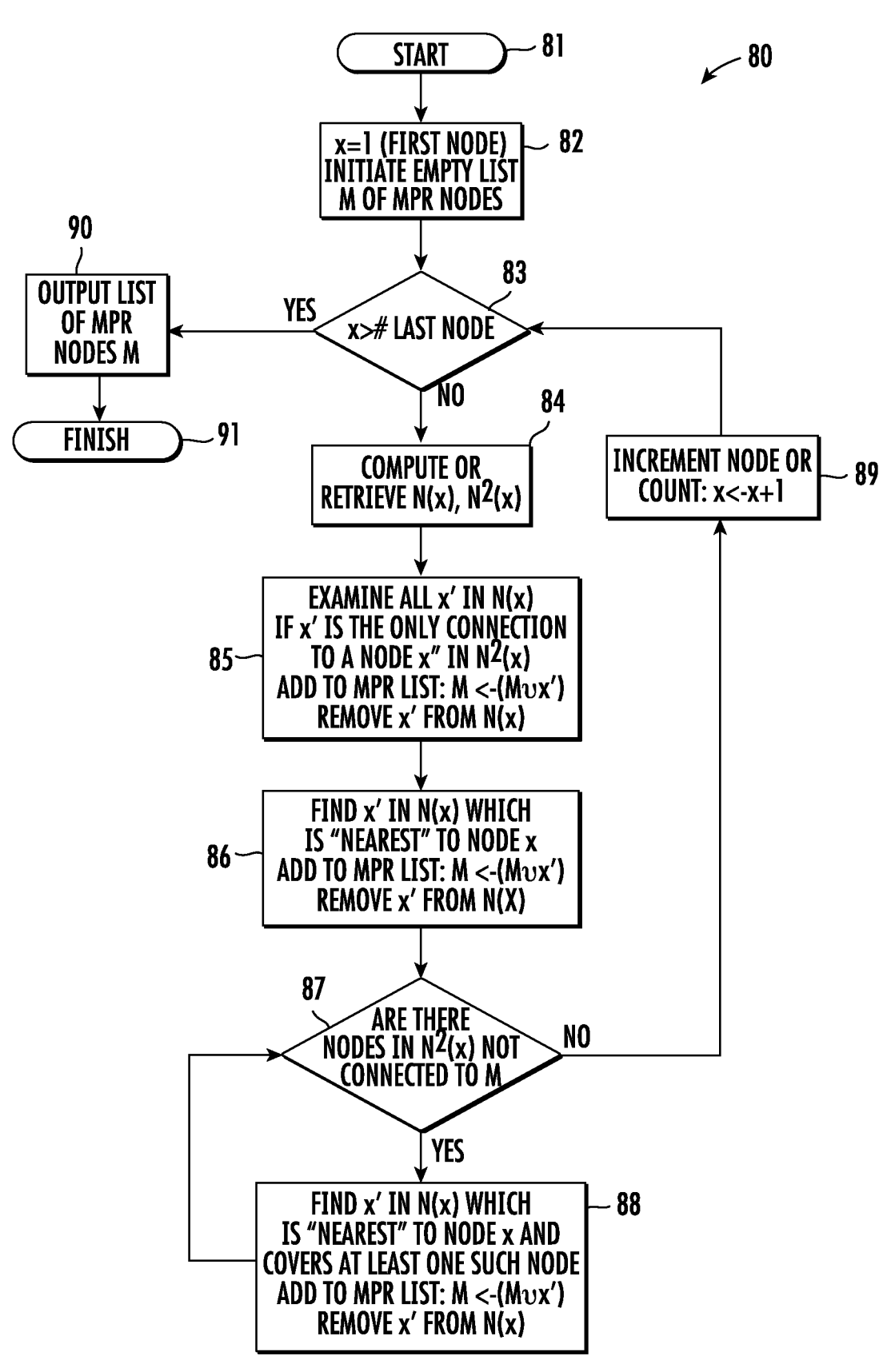
FIG. 8 is a flow diagram illustrating an MPR algorithm for radio networks in accordance with an example embodiment.

Turning now to the flow diagram 80 of FIG. 8, an example MPR algorithm and associated pseudocode for implementing the above-described power aware approach in radio networks is now described. In the flow diagram 80 and the following pseudocode, N(x) is the set of nodes that can be reached from node x in one hop, and $N^2(x)$ is the set of nodes that can be reached from node x in two hops. Beginning at Block 81, the pseudocode is as follows:

```
x=1 (first node) initiate empty list M of MPR nodes (Block
82)
    IF x ≤ # last node (Block 83)
        compute or retrieve N(x), N²(x) (Block 84)
        examine all x' in N(x) (Block 85)
            if x' is the only connection to a node x"
            in N²(x) add to MPR list: M <– (M U x')
            remove x' from N(x)
        find x' in N(x) which is "nearest" to node x
            add to MPR list: M <– (M U x')
            remove x' from N(x)
        IF nodes in N²(x) not connected to M (Block 87)
            find x' in N(x) which is "nearest" to node x
            AND covers at least one such node
                add to MPR list: M <– (M U x')
                remove x' from N(x)
        ELSE increment node or count: x <– x + 1 (Block 89)
    ELSE
        output list of MPR nodes M (Block 90).
```

The method of FIG. 8 illustratively concludes at Block 91.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

The invention claimed is:

1. A multi-point relay (MPR) wireless network comprising:
a plurality of spaced apart nodes, each node comprising wireless transceiver circuitry, beacon circuitry, and a controller coupled to the wireless transceiver circuitry and beacon circuitry;
the plurality of controllers configured to operate the beacon circuitry to determine a respective link strength metric for each potential link between nodes,
assign a set of nodes from among the plurality of nodes to function as gateway nodes and assign other individual nodes to communicate via respective gateway nodes based upon the respective link strength metrics to define the MPR network so that one-hop links have a strongest link strength metric, and
operate the wireless transceiver circuitry for communications over the MPR network and reduce transmit power while meeting a desired data rate.

2. The MPR wireless network of claim 1, wherein the wireless transceiver circuitry is configured to transmit a plurality of orthogonal data streams.

3. The MPR wireless network of claim 1, wherein the wireless transceiver circuitry is configured to transmit a plurality of data streams at different data rates.

4. The MPR wireless network of claim 1, wherein the wireless transceiver circuitry comprises Code Division Multiple Access (CDMA) circuitry.

5. The MPR wireless network of claim 1, wherein the link strength metric comprises at least one of a link loss, link signal-to-noise ratio, and link peak data rate.

6. The MPR wireless network of claim 1, wherein at least one of the plurality of nodes comprises a ground-based, mobile node.

7. The MPR wireless network of claim 1, wherein the wireless transceiver circuitry is configured to communicate one of voice and video data.

8. A node for a multi-point relay (MPR) wireless network comprising a plurality of spaced apart nodes, the node comprising:
wireless transceiver circuitry, beacon circuitry, and a controller coupled to the wireless transceiver circuitry and beacon circuitry;
the controller configured to cooperate with controllers of other nodes to
operate the beacon circuitry to determine a respective link strength metric for each potential link between nodes,
assign a set of nodes from among the plurality of nodes to function as gateway nodes and assign other individual nodes to communicate via respective gateway nodes based upon the respective link strength metrics to define the MPR network so that one-hop links have a strongest link strength metric, and
operate the wireless transceiver circuitry for communications over the MPR network and reduce transmit power while meeting a desired data rate.

9. The node of claim 8, wherein the wireless transceiver circuitry is configured to transmit a plurality of orthogonal data streams.

10. The node of claim 8, wherein the wireless transceiver circuitry is configured to transmit a plurality of data streams at different data rates.

11. The node of claim 8, wherein the wireless transceiver circuitry comprises Code Division Multiple Access (CDMA) circuitry.

12. The node of claim 8, wherein the link strength metric comprises at least one of a link loss, link signal-to-noise ratio, and link peak data rate.

13. A method of operating a multi-point relay (MPR) wireless network comprising a plurality of spaced apart nodes, each node comprising wireless transceiver circuitry, beacon circuitry, and a controller coupled to the wireless transceiver circuitry and beacon circuitry; the method comprising:
using the plurality of controllers to operate the beacon circuitry to determine a respective link strength metric for each potential link between nodes,
assign a set of nodes from among the plurality of nodes to function as gateway nodes and assign other individual nodes to communicate via respective gateway nodes based upon the respective link strength metrics to define the MPR network so that one-hop links have a strongest link strength metric, and
operate the wireless transceiver circuitry for communications over the MPR network and reduce transmit power while meeting a desired data rate.

14. The method of claim 13, comprising operating the wireless transceiver circuitry to transmit a plurality of orthogonal data streams.

15. The method of claim 13, comprising operating the wireless transceiver circuitry to transmit a plurality of data streams at different data rates.

16. The method of claim 13, wherein the wireless transceiver circuitry comprises Code Division Multiple Access (CDMA) circuitry.

17. The method of claim 13, wherein the link strength metric comprises at least one of a link loss, link signal-to-noise ratio, and link peak data rate.

18. The method of claim 13, wherein at least one of the plurality of nodes comprises at least one ground-based, mobile node.

\* \* \* \* \*